March 19, 1963   J. S. CARTER, JR   3,081,727
HIGH SPEED WATER SURFACE CRAFT

Filed Sept. 21, 1959   7 Sheets-Sheet 1

INVENTOR.
JOHN S. CARTER JR.
BY
Roland A Dexter
his attorney

March 19, 1963  J. S. CARTER, JR  3,081,727
HIGH SPEED WATER SURFACE CRAFT

Filed Sept. 21, 1959  7 Sheets-Sheet 2

*INVENTOR.*
JOHN S. CARTER JR.
BY
Roland A. Dexter
his attorney

March 19, 1963  J. S. CARTER, JR  3,081,727
HIGH SPEED WATER SURFACE CRAFT
Filed Sept. 21, 1959  7 Sheets-Sheet 3

*INVENTOR.*
JOHN S. CARTER JR.
BY
Roland A Dexter
*his attorney*

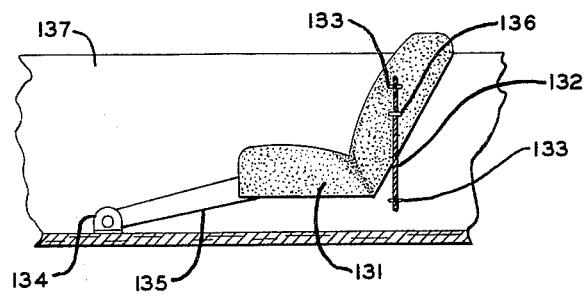
FIG. 12
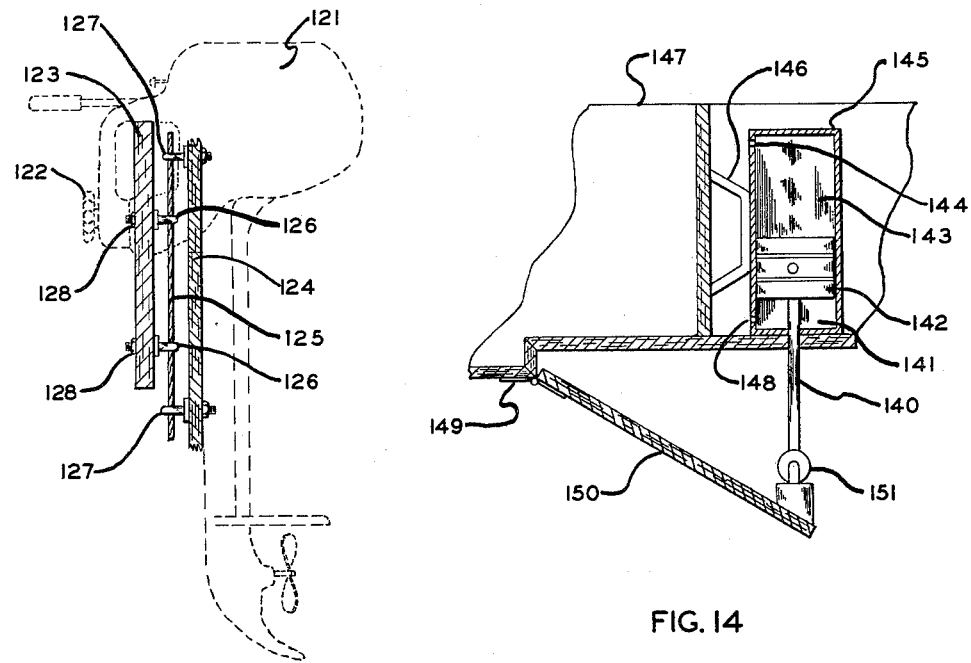
FIG. 14
FIG. 11
*INVENTOR.*
JOHN S. CARTER JR.
BY
Roland A Dexter
his attorney March 19, 1963 J. S. CARTER, JR 3,081,727
HIGH SPEED WATER SURFACE CRAFT
Filed Sept. 21, 1959 7 Sheets-Sheet 5

*INVENTOR.*
JOHN S. CARTER JR.
BY
Roland a Dexter
his attorney

March 19, 1963  J. S. CARTER, JR  3,081,727
HIGH SPEED WATER SURFACE CRAFT
Filed Sept. 21, 1959  7 Sheets-Sheet 6
FIG. 15
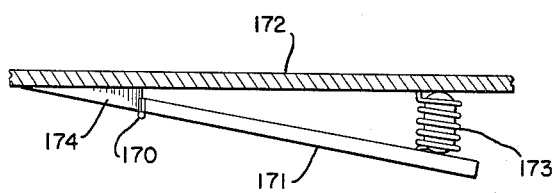
FIG. 18
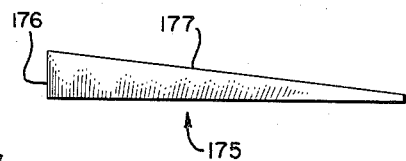
FIG. 16
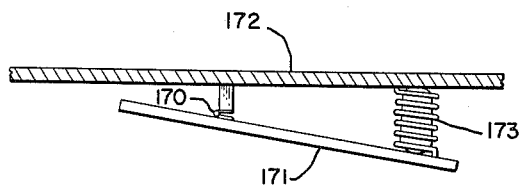
FIG. 18A
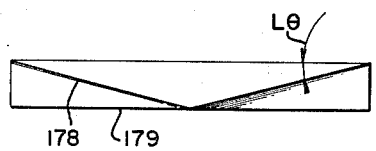
FIG. 17
FIG. 19
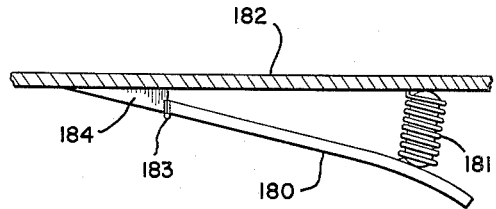
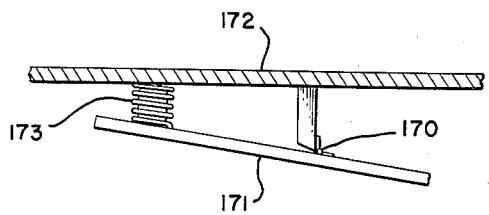
*INVENTOR.*
JOHN S. CARTER, JR.
BY
*ATTORNEY*

March 19, 1963  J. S. CARTER, JR  3,081,727
HIGH SPEED WATER SURFACE CRAFT
Filed Sept. 21, 1959  7 Sheets-Sheet 7
FIG. 20
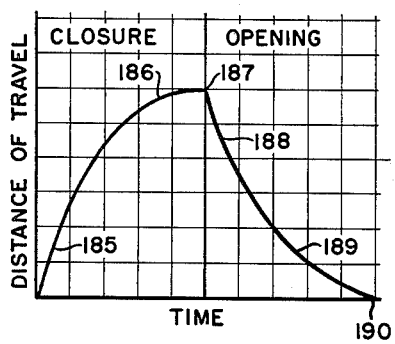
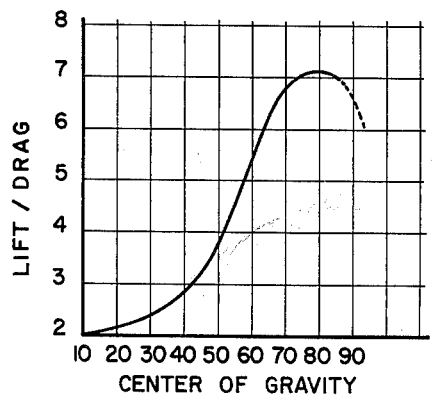
FIG. 23
FIG. 21
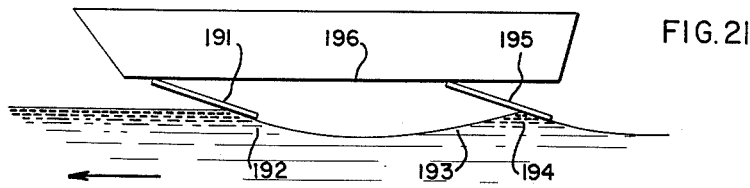
FIG. 24
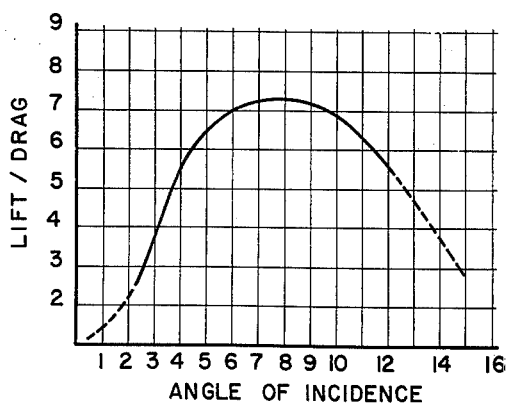
FIG. 22
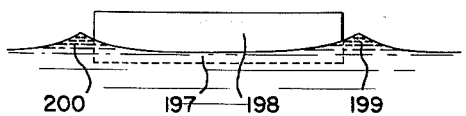
INVENTOR.
JOHN S. CARTER, JR.
BY
ATTORNEY

3,081,727
HIGH SPEED WATER SURFACE CRAFT
John S. Carter, Jr., 63 Crescent Road,
Needham Heights, Mass.
Filed Sept. 21, 1959, Ser. No. 841,414
11 Claims. (Cl. 114—66.5)

This application is a continuation-in-part application of application Serial No. 560,952, filed January 24, 1956, now abandoned.

This invention relates to an improvement of high speed water surface craft and more particularly to hull construction using a plurality of planing members.

The important types of power driven surface craft are generally of three different categories:

(1) Displacement craft which are supported solely by the buoyancy of the water. The speed of these vessels is a function of the length and is represented by the ratio $$\frac{V}{\sqrt{L}}$$

If this ratio is greater than one, the power required is excessive.

(2) The V-bottom or speed boat which is partially supported by displacement and partially by dynamic reactions. V-bottom craft depend on planing for their speed, but must compromise by having sufficient displacement to cushion the pounding of small waves.

(3) The step hydroplane which is supported almost entirely by dynamic reactions having negligible displacement.

One other broad category of surface craft includes the various experimental types of vessels, some of which are operable under limited sea conditions, and some of which, it is doubtful, operate at all. Among the former classification are the sea-sleds, the hydrovanes, and the hydrofoils, plus a various assortment of sea-plane floats, particularly the scow type.

Where high speed performance is required, particularly on broken water surface, all these types of craft suffer from severe limitations and disadvantages. It is apparent that the displacement type vessel, although exhibiting some sea-worthiness in rough seas, is essentially a slow craft. For higher speeds, the hydroplane or similar planing craft which is supported almost entirely by dynamic forces are normally used. Unfortunately, these types of planing craft are useless in rough or disturbed seas. With small wind-blown shop, this craft is subjected to intensive pounding and hammering with the result of instability and danger of destruction of the hull. The V-bottom speed boat which relies partially on dynamic forces to support the craft, and partially on displacement, is a natural compromise between the stability of the displacement craft with the speed of the hydroplane. But, this compromise effects both a loss in speed and stability, and results in inefficient hull design.

It is well known that the effect on a hydroplane running at high speed over broken water is similar to that of dragging it at high speed over rough ground. Consequently, the limitations of the hydroplane are readily seen by observing the water conditions over which they must travel.

Smaller irregularities which appear on water surface may be due to the residue effect of larger waves, to gusts and squalls blowing at various angles with the wave crests, and to other causes. The severe effect of these small irregularities on hydroplanes will be understood by considering their action.

Hydroplanes draw so little water that a few inches change in surface elevations may cause very considerable increases in lift. Thus, if the height of a wave is only one inch per foot of length, the increase of angle of incidence of a plane would be 5 degrees. If the original incidence were as high as 9 degrees, the dynamic lift would be more than doubled. Fore and aft contact of a hydroplane at high speed is very small, consequently, if a wave of a few inches in height is encountered, and the crest has a considerable mass, a very great increase in the lift results, the amount of lift at any given speed being approximately proportional to the area of water contact and the square of the sine of the angle of incidence. Because of the suddenness of the occurrence, the result is severe pounding.

The cause of this pounding is as follows: when a craft is supported by dynamic reactions, the bottom must necessarily follow the contour of the water surface irregularities. These irregularities produce upward accelerations which at high speeds are sufficiently severe to produce pounding and hammering. This pounding constitutes an upward force of the water reaction. It therefore follows that the smaller the area on which the total force is concentrated, the greater the intensity per square foot. To withstand these heavy unit stresses, the bottoms of conventional craft must be strengthened, which increases the stiffness under stress, thereby further increasing the unit stresses. There are therefore sea conditions, depending upon wave contours and mass, that will fix critical speeds beyond which it is impractical and dangerous to drive any of the present craft.

The reason water can cause these severe reactions is because it is an incompressible fluid with a mass of about two slugs per cubic foot. Thus, while the pounding appears to be similar to that caused by dragging the craft over ground, the effect of the boat bottom on the water is to accelerate the water it contacts; therefore, the mass of the water at the point of contact is an element determining the severity of the pounding.

This fact is taken advantage of in high speed boats by using dead rise to reduce the mass at any contact. However, if sufficient dead rise were used to eliminate pounding, the craft would not plane, and so a compromise is effected. The exceptions to the use of dead rise might be noted: the sea-sled type which has a tunnel that amounts to a negative dead rise; and, some early aircraft floats which were of the scow type, but subject to such severe punishment that they were only used experimentally.

Another severe limitation to present types of high speed craft is that they tend to develop dynamic and longitudinal instability as a result of changes in trim, which is also responsible for the pounding, as explained above. The lift of a planing surface varies with the incidence angle and the center of pressure shifts in its position fore and aft with each change of incidence. Thus, if the change in trim caused by the shift of the center of pressure also changes the incidence in the same direction, the craft will develop dynamic instability. In a V-bottom vessel, the center of buoyancy will, in general, shift in an opposite direction to the shift of the center of dynamic lift with the change in trim. Also the displaced water tends to damp out oscillations in trim. In the step-hydroplane, the stability is approximated by two surfaces, one at the step and one at the transom. This method of design is entirely empirical as the incidence can not be predetermined. The surface at the transom is running in the downwash of the step. Exact bottom angles, height of step, angle of dead rise and dimensions of non-trips can only be found from experiments with full size hulls. If these elements are varied even slightly, the hull may become unstable at high speeds.

Besides the uncertainty as to the exact effect of downwash, the incidence is further complicated by the effect of dead rise increasing forward with both the trim and wetted areas unknown. Therefore, the performance of either a V-bottom or a step-hydroplane is not subjected to qualitative analysis and can only be designed by cut and try methods.

It is thus an object of the present invention to overcome the foregoing and related disadvantages of the known types of water surface craft.

It is a further object of this invention to produce a high speed water surface craft which exhibits extremely low drag and prevents dynamic instability.

It is still a further object of this invention to eliminate the usual hammering and pounding of the bottom when navigating at high speed over rough water.

Another object is to secure a fixed and predeterminable trim so that design and performance are subjected to mathematical analysis.

Another object is to reduce the water resistance at high speeds to less than that of other water borne craft.

Another object is by careful design of the plane configurations, angles of incidence, plane spacing, and location of center-of-gravity, to effect a craft that exhibits an extremely high lift/drag coefficient, resulting in very efficient performance with subsequent fuel savings and economies.

Another object is to embody the advantages of this invention in a structure that weighs less than other comparable craft and that can consequently be constructed at less expense and more rapidly than it is possible with any of the present types of hulls.

Other objects of this invention will be apparent from the following specification, as well as the appended drawings, in which:

FIGURE 1 pictures a side view of the basic hull design of the invention;

FIGURES 2, 3, and 4 pictorially show three types of surface craft in accordance with this invention;

FIGURE 5 illustrates one type of bow design of the water surface craft;

FIGURE 6, the stern view of an outboard type craft;

FIGURES 7 and 8, typical resiliently mounted planes;

FIGURE 9, spring and shock absorber device which both absorbs dynamic forces resulting from water surface irregularities and causes the planes to maintain the predetermined angle;

FIGURE 10, a cross-section illustrating one scheme for mounting dead weights in such a fashion that none are concentrated upon the bottom of the hull;

FIGURE 11, an elastic mounting means of an outboard motor;

FIGURE 12, an elastic mounting of the seating arrangement of the craft;

FIGURE 13, the cross-sectional view of the inboard motor mounting and flexible transmission means to the propeller;

FIGURE 14, the dampening device which tends to dampen out any oscillation of the planes;

FIGURE 15 illustrates a modification characterized by a hinged plane with a combination pneumatic rubber bag and compression spring shock absorber;

FIGURES 16 and 17 show variations of hinging and shock-mounting the planes;

FIGURES 18 and 18A show side and forward edge views, respectively, of a warped suppressor plane;

FIGURE 19 illustrates a concave downward plane variation of the modification shown in FIG. 15;

FIGURE 20 graphically shows the characteristic shock-absorption pattern;

FIGURE 21 is a somewhat diagrammatic view illustrating proper plane spacing resulting in the carrier plane recovering some of the energy of the downwash from the suppressor plane;

FIGURE 22 is a diagrammatic view illustrating a transverse section of the wave at the carrier plane; and FIGURES 23 and 24 are graphic views demonstrating the results of varying the center-of-gravity and the angle of plane incidence.

The objects set forth above have been achieved in accordance with an exemplary embodiment of this invention by the fabrication of a high speed water surface craft, the bottom of which exhibits virtually no dead rise except for the bow section, and which has a plurality of substantially rectangular planes, at least one of which is resiliently mounted, at least said one plane being fully compressible and dampened to prevent oscillation and having an angle of incidence between about 4 degrees and about 12 degrees, relative to the plane of the bottom of the hull, and supporting means attached generally to the trailing edges of at least said one plane so as to provide substantially identical upward and downward acceleration responsive to variations of dynamic stresses.

Figure 1:
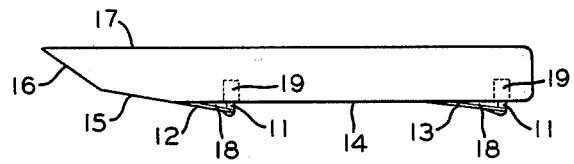

Perhaps before elaborating further, it would be advisable to refer to FIGURE 1, which shows in a cross-section, the basic construction of one form of my surface craft. From the hull extends two lifting surfaces, or planes, 12 and 13 which are resiliently mounted, and which, for descriptive purposes, shall be designated as the suppressor and the carrier respectively. The bottom of the hull 14 exhibits no dead rise from bilge line to bilge line. Under certain conditions, it might be desirable to incorporate some slight dead rise in the hull bottom, in the magnitude of about 5° to about 10°. In this case, either or both of the planing surfaces might be similarly profiled to exhibit a similar pattern of dead rise. The leading edge of the suppressor merges into the hull bottom, which bottom continues upward as an extension of the plane of the suppressor for a distance generally comparable to or greater than the fore and aft length of the suppressor plane 12, as at 15. Thereafter, the bow bottom rises at an increasing angle to the top plane 17 of the hull. The angle 18 which defines the mounting of the planes 12 and 13 should be from about 4 degrees to about 12 degrees. It has been found that the extension of the angle, beyond that range, deleteriously affects the performance of the craft, both by increasing the drag and inducing dynamic instability. The planes 12 and 13 are to be of generally rectangular form, which configuration results in the least drag during the travel of the craft. It has further been found that this drag can be reduced more by efficient profiling of the planes in a concave downward fashion. The distance from the trailing edge of the suppressor 12 to the leading edge of the carrier 13 should be sufficient to provide proper interaction of the downwash of plane 12 with plane 13, which results in maximum lift at plane 13 and maximum efficiency, as illustrated in FIGURE 21.

Shown in dotted form are supporting and dampening means 19 which are mounted at the trailing edges of the suppressor and carrier planes 12 and 13. These supporting and dampening means prevent oscillation of the resiliently mounted planes as the dynamic forces change, and further provide substantially identical acceleration and deceleration in the vertical movement of the trailing edges of the planes. When the craft is moving at planing speeds, only the planes 12 and 13 contact the water surface with the exception of severely disturbed surface conditions when occasionally the hull bottom grazes the surface.

It is evident that since both planes 12 and 13 are of limited area, no considerable increase in the surface area of water contact is possible. Also, since planes 12 and 13 are widely spaced, and since they are set at relatively high angles of incidence, changes in trim will have a minimum effect on the incidence; therefore, the tendency to pound is greatly decreased.

The action of my craft on encountering severely disturbed water is as follows: on contacting a steep wave at high speed, the bow forward of the suppressor is of such a sharp contour that it penetrates the wave crest with a minimum of resistance. The suppressor rides up the wave and then the penetrated crest, and, being remote from the center of gravity, only produces a slight angular acceleration at points where crew and weights are concentrated with no discomfort and little extra strain to the hull.

The forward part of the hull follows the suppressor into the break in the crest of the wave and, as the hull widens, the sides turn back more of the crest and the intermediate bottom begins to pick up part of the load. It will be noted that the intermediate bottom is at a very low angle of incidence and will not lift with the violence of the speed boat or the hydroplane as explained above.

The widening bottom picks up the load as it slides over the wave crest. The action is somewhat like a toboggan. The entire boat is hoisted over the wave crest without any violent concentrations of stress such as cause speed boats and hydroplanes to pound. When the center of gravity passes the crest, the boat trims by the bow by bringing the suppressor back on the water surface, and at almost the same time, the carrier 13 is picking up the load from the intermediate bottom and the craft is again running on two surfaces 12 and 13 with the intermediate bottom clear of the water surface.

It is thus seen that the craft of the invention will run at high speed through large waves, chop, and broken water with an easy pitching motion as opposed to the violent pounding and hammering that must occur in speed boats and step-hydroplanes.

To eliminate said pounding, the surfaces 12 and 13 are elastically and dampenedly mounted, and the intermediate bottom has a certain flexibility, both as explained. The flexible nature of the intermediate bottom is particularly important when the craft of the invention is designed for open sea conditions, or used in roughen seaways. On generally smooth waters the intermediate bottom is normally out of the water, and said flexible nature of the bottom is of little importance particularly on small and slower craft of the outboard type.

Having eliminated the pounding on both larger waves and smaller irregularities without the use of inefficient construction, improvements in performance over other craft now becomes practical. It has been generally believed in hydroplane design that the lift/drag ratio can be improved by reducing the incidence. This is true at low speeds where the effects of the friction component of drag are small, but at higher speeds the drag at low angles becomes very significant because of increase of the friction component. Larger angles give a larger dynamic drag component, but smaller friction drag component, and at high speed the lift/drag ratio is greater for larger angles. For my craft the angle of incidence for best performance at high speeds should be of from about 4 degrees to about 12 degrees. Under usual conditions, it is preferred to be from about 6 degrees to about 10 degrees.

On my craft, only the limited planing areas of planes 12 and 13 are subjected to intense pressures. However, these pressures are relieved by the elastic mounting of the planes. Furthermore, in unusually rough water, the intermediate bottom relieves any excess forces because of its flexible nature. Thus, in rough water, the water contacts being at a very low angle of incidence are necessarily distributed over considerable area, with the obvious result that no local intense stresses can develop.

By use of a somewhat flexible bottom, as stated above, no stiffening by floors or ribs is necessary with a consequent saving in weight. With other planing craft, it is not practical to use a flexible bottom. For with these other craft, the bottom would deflect and maintain the center of pressure far forward, causing the craft to trim by the stern. In such craft assuming this attitude, no reasonable amount of power will be able to make it come up and plane.

On my craft, the carrier plane set at high angle of incidence trails the intermediate bottom, and, as a consequence, when the craft is accelerating initially, the downwash from the low angle intermediate bottom can not clear this plane. Thus it prevents trimming by the stern, and picks up the weight much more rapidly than the intermediate bottom, with the result of keeping the craft on level trim. This means that my craft can attain planing speed more rapidly with more weight per pound of propeller thrust than any other practical craft.

Where extremely large dynamic impacts are met, the planes 12 and 13 will fully compress, or close with the plane of the hull bottom, absorbing any excess energy in the flexible hull bottom, and then the planes will rapidly return to a normal running position. This ability of the planes to follow the contour of waves after partial or full compression eliminates the dynamic instability and severe pounding which characterize prior craft.

The action of the planes 12 and 13 under normal running conditions can be explained as follows: on encountering chop, a force imparts itself to the plane, which results in an upward acceleration. The resilient action of the plane is so designed that, when subjected to variations due to dynamic impacts, it will respond to this upward acceleration immediately, and begin to close. The action under dynamic impact can be described as an initially rapid rate of closure followed by a diminishing rate of closure until the position is reached where the build-up of potential energy equals the original impact. On the reverse side, the action is identical; that is, a rapid rate of opening followed by a diminishing rate. This function is graphically shown in FIGURE 20. The sum of all this action is to momentarily absorb the acceleration caused by the chop, or surface disturbance, without imparting excessive forces on the craft, as well as to prevent unstable conditions such as periodic oscillation.

To achieve longitudinal stability and for optimum operation of the craft in this respect, it has been found desirable that the carrier plane should support a load from about 60% to about 80% of the total gross weight of the craft. This would place the balance of the weight on the suppressor plane. The reason for this is that for longitudinal stability I have found that by making the suppressor plane the trimming plane, the practical effect is to make the boat trim by the bow, thus retaining stability and eliminating discomfort and stress to the passengers and equipment, the majority of which will be located aft. Also for stability purposes and reducing any pounding and hammering which might otherwise tend to be set up, I have discovered that the resiliently mounted planes 12 and 13 should show full compressibility (i.e., full closure) when encountering sudden dynamic upward forces in the magnitude of about 2 to 5 $g$, that is, forces equal to from about 2 to 5 times the weight of the craft. In determining the limits of 2 to 5 $g$, it is based on the original plane incidence of from 4° to 12° at a one $g$ loading, that is, supporting only the gross load of the craft.

Figure 5:
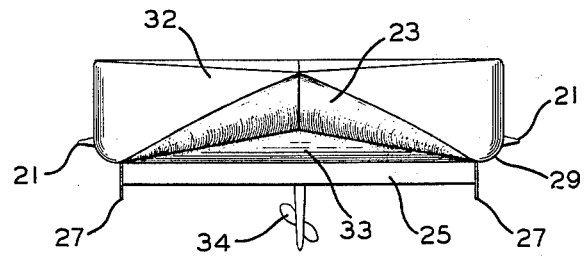

For optimum results, I have discovered that the bow design should be in accordance with FIGURE 5. The effect of this bow design is to give maximum wave penetration with minimum resistance. Also, since the lower part of the bow is an extension of the angle of the suppressor plane, the water contacts have imparted to them substantially the same acceleration as the plane imparts to the water. This limits any increase in incidence, which otherwise would have the effect of lifting the bow section out of the water with the result of pounding. However, for normal usage, the bow design has little effect on the hull performance due to the fact that the entire hull rides out of the water at a height determined by the length and angle of the planes.

I have also discovered that for optimum performance the craft should have at least one plane fitted with skegs. These skegs prevent any skidding on very tight turns. I have further discovered that by proper profiling, or warping, of the front plane, the skegs can be eliminated. The use of non-trips is important so that should the boat heel on a sharp turn, the water will be accelerated away from the boat, which water might otherwise enter the craft and cause a dangerous condition.

Besides water surface craft, my invention relates to use as floats or the hull of water based aircraft. All of the conditions and advantages set forth above have direct application to use in flying boats, as is obvious to anyone skilled in the art. Thus, by employing these principles as stated above, water-based aircraft are no longer limited to protected waters, but can now be used at open sea with safe results. Also, because less thrust per pound of load is necessary, flying boats no longer need to carry an excess of power for use only on take-offs. In flight the planes are retracted so as to be flush with the plane of the bottom producing an aerodynamically clean surface.

Figure 2:
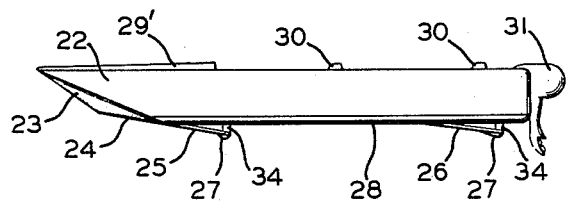
Figure 3:
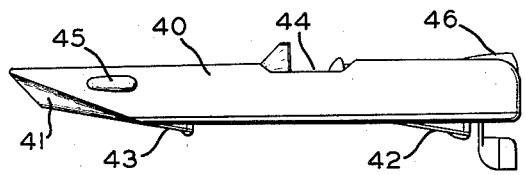
Figure 4:
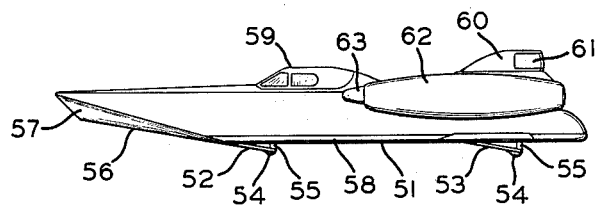
Figure 6:
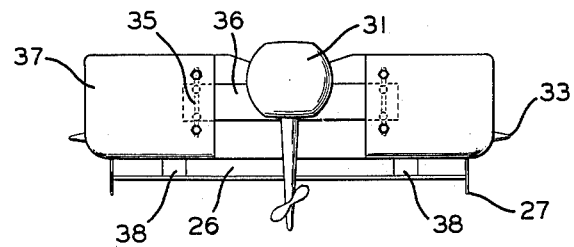

Now that the basic approach to my craft has been considered, let us examine the three embodiments of the craft which are shown as FIGURES 2, 3, and 4. In FIGURE 2, one sees the outboard type of construction. The craft 22 has a concave bow portion 23 which has a keel trim line 24 as an extension of the suppressor plane 25 surface. Disposed at the edges of the rectangular suppressor plane 25 as well as the rectangular carrier plane 26 are skegs 27. The bottom of the hull 28 exhibits no trim fore and aft and no dead rise. Along the sides of the bottom are non-trips which prevent water from shipping into the craft during any heeling movement. The deck is shown at 29' while seats 30 are shown both midships and aft. The outboard motor by which means the craft is propelled is designated 31. Before continuing on to the other embodiments using the hull construction of the invention, refer to FIGURES 5 and 6 which show the bow and stern views of the outboard craft of FIGURE 2 respectively. In FIGURE 5, it is seen that the side of the boat 32 is joined to the bow area 33 by concave region 23. The concave angle of this region 23 is that angle which will produce upon contact with a wave, a downwash angle which will substantially parallel the angle of the suppressor 25. It is seen that the suppressor plane 25 is rectangular in shape and has at its opposed edges the skegs 27. Also more clearly shown is the bilge line 29 which extends from the chine of the no dead rise hull to the side of the craft. Also indicated in this view is the spray rail 21 which extends from the side of the craft so as to prevent spray from striking the occupants of the craft. Also shown is propeller and mounting bracket 34. Now looking at FIGURE 6 which is a stern view of the same craft, most of the elements are apparent from the preceding discussion. In this view however is shown the struts 38 which were not apparent in the preceding views. These struts are connected from substantially the trailing edges of their respective planes, in this case the carrier plane 26 to the dampening supporting means which exhibits mechanical hysteresis and allows the resiliently mounted planes to be fully compressed. The engine 31 is mounted by a resilient structure which will be further elaborated on, however, there is shown in this view the shock absorber cord 35 which is connected to the engine mount 36 and serves to bind the engine mount 36 to the stern of the craft 37.

In FIGURE 3, there is shown a diagrammatic view of an inboard motor water surface craft in accordance with this invention. The craft 40 has the concave bow section 41 and the carrier and suppressor planes 42 and 43. The cockpit and seat are shown at 44 with the light 45 which has a flush encased lamp housing, while the stern and side running lights are designated as 46.

FIGURE 4 is a craft designed for extremely high speeds, as it is propelled not by conventional propeller means, but rather by jet propulsion. Here again is shown the no dead rise hull 51 with suppressor and carrier planes 52 and 53 respectively. Skegs on their respective planes are shown as 54 as well as the struts 55. Beyond the leading edge of the suppressor plane 52 is a keel trim line at 56 which is a continuation of the angle of the suppressor plane. Also present is the characteristic concave section of the bow at 57, as well as the non-trip at 58. The driver of this craft is fully enclosed in a cockpit 59 having as his control members, stabilizer 60 and rudder 61. The propelling means is designated generally at 62 which is a jet engine having air intake 63. It is not necessary to go into the power plant for this type of craft, as suitable jet propulsion means are known to the art.

The planes, as stated, must meet numerous requirements; that is, they must be of generally rectangular shape, they must be resiliently and dampenedly mounted, must be fully compressible under dynamic impact, mounted at an angle from about 4 degrees to about 12 degrees from the plane to the bottom of the hull, and the trailing edges exhibit vertical movement as the dynamic forces change so that the planes will tend to remain in contact with the water at all times. It is desirable that the carrier plane should have from about 60% to about 80% of the gross weight of the craft concentrated on it for best dynamic stability, also to have the skegs present at the sides of the suppressor plane adjacent the trailing edge, and finally that the trailing edge of the front plane to the leading edge of the rear or carrier plane should be at least 6 feet, so as to prevent unfavorable interaction of the downwash of the suppressor plane with the carrier plane. Specially shaped planes may be employed, at slight sacrifices to efficiency, for various design purposes as previously described.

Figure 7:
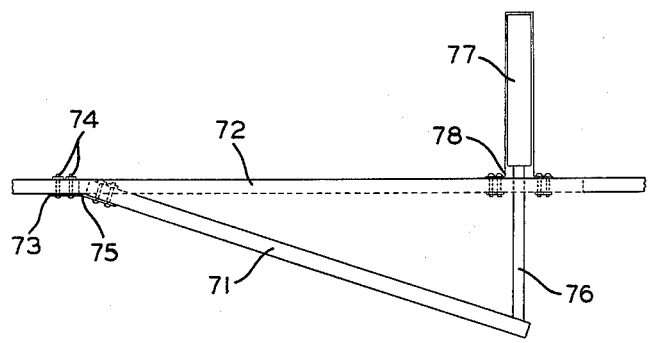
Figure 8:
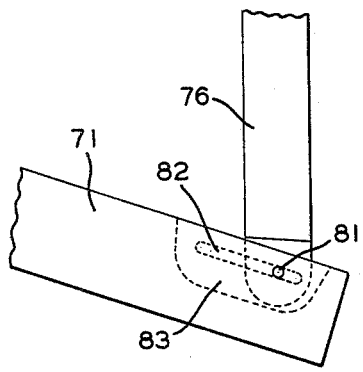

In FIGURE 7, there is shown in elevational view such a plane which can be either the carrier or suppressor, although it is apparent that this is the carrier plane in that the plane of the hull extends forward with no trim. Thus in FIGURE 7 the flush mounted carrier plane 71 is secured to the bottom of the hull 72 by a hinge plate 73. The plane can be flush mounted by providing a step as shown in FIGURE 14, or by a shallow well as shown in FIGURE 7. Bolts 74 secure the hinge plate 73 to the hull 72 which plate has the hinge at 75 so that the flush mounted carrier plane 71 can move about the axis of the hinge 75. Strut 76 secures the trailing edge of the suppressor plane to the cylinder 77 which is attached to the hull at 78 by a flanged member not in contact with the bottom and secured to the side of the hull. For a better explanation of the manner in which the strut 76 is secured to the trailing edges of the suppressor plane reference should be made to FIGURE 8 which shows a greatly exaggerated view of the connection of strut 76 to the plane 71. The strut 76 has flanged extensions 81 which cooperate with a depression at 82 which depression is part of a mechanical assembly 83 disposed within the opening indicated by the dotted lines. This securement of the strut allows compensation for the variation of the angle to which the suppressor or carrier plane is subjected to during the travel of the craft. Besides this general arrangement, variations can be made as shown in FIGURES 15, 16, and 17, wherein 170 indicates the hinging mechanism, 171 is the plane, 172 is the hull bottom, and 173 is the pneumatic rubber bag and spring shock absorber. These various illustrations show planes that are hingedly secured to the hull bottom and provided with resilient and dampening means.

Figure 9:
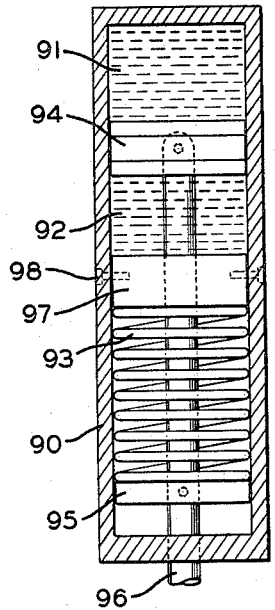

It has been brought out that it is necessary to provide a supporting means for the carrier and suppressor which allows full compressibility of the plane when subjected to a certain dynamic stress and which dampens any tendency of the carrier or suppressor to oscillate upon repeated changes of the dynamic stress. Such a means is graphically presented in FIGURES 9 and 14. In FIGURE 9, shock absorber and spring mechanism are shown encased in cylinder 90. The spring assembly within the cylinder 90 comprises a spring 93 and spring plate 95 which is connected to the piston 94 by connecting rod 96.

The air or fluid cylinders 91 and 92 provide shock absorbing action, while spring 93 provides support and temporary storage of energy arising out of the dynamic forces. The cylinder 90 is divided into two chambers by a fixed separator 97 which is secured in place by bolts 98. This shock absorbing action works on either the upward or downward movement of rod 96.

FIGURE 14 shows a dampening device which is attached to the plane 150 by connecting rod 140. Connecting rod 140, secured at one end to carrier plane 150 by a ball and socket arrangement 151, transmits the dampening action of the piston 142 within the gas filled cylinder 145 to the plane 150. Air bleeder holes 144 and 148 permit the intake and exhaust of the gas from their respective halves of cylinder 141 and 148. Mounting bracket 146 secures the cylinder to the hull 147. Plane 150 is hinged at 149. As a dynamic force tends to close the plane, gas in the cylinder 143 is substantially compressed, and this gas gradually is bled off at bleeder 144. After passing over a wave, the plane tends to drop away rapidly, thus the piston 142 drops down rapidly and tends to compress the gas in cylinder 141 which in turn is bled off at 148. The effect of this is the dampening out of any oscillation which might tend to set up on either the upward or downward motion of the plane 150. One other shock absorption device, the pneumatic rubber bag and compression coil spring is illustrated in FIGURE 15 at 173. The resultant action of this mechanism is very similar to the combined action of FIGURES 9 and 14.

As previously pointed out, the bottom of the planing craft is often subjected to occasional intense local pressures in rough water. Even the large ocean-going cargo steamers, when navigating light, so that the flat bottom is exposed to the waves, have their steel bottoms, backed by deep floors, crumpled in as though driven on the rocks In my craft, however, the planing surfaces of limited extent are usually the only portions subjected to these higher pressures and this is further relieved by the resilient mounting of the planes. The intermediate bottom between the suppressor and carrier is normally clear of the water's surface and preferably should exhibit a certain degree of flexibility. Furthermore, to relieve stresses in the dead weights within the craft which might develop when the planes are fully closed, the dead weights may be resiliently mounted as will be set forth hereinafter.

Figure 10:
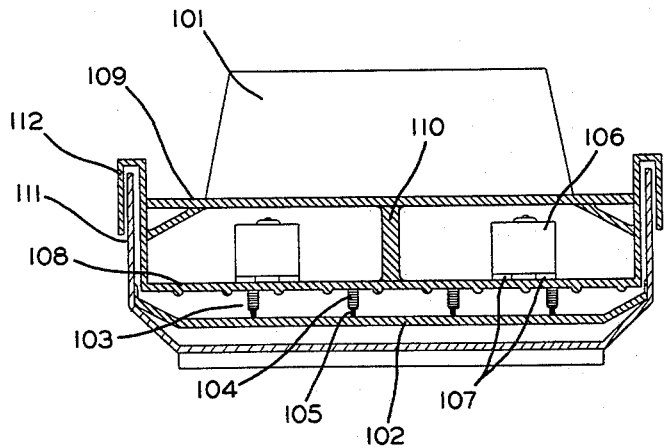

In FIGURE 10, the representative cross-sectional view is shown of a resiliently mounted superstructure which distributes all the dead weights in such a fashion that none are concentrated upon the bottom of the hull. In this 101 refers to the cabin superstructure. Rib 102 supports the shock absorber systems 103. The shock-absorber systems are each essentially a spring and dampening member, demonstrating mechanical hysteresis, mounted upon a member 105. The engines 106 are in turn mounted on rubber engine mounts 107. The floor deck 108 along with the top deck 109 and its supporting members 110 is isolated from the craft hull and is secured to the sides by means of the rib 102. The deck section extends from the sides as a flanged portion which extends upward and over the side of the craft 111 and 112. It is thus readily seen that no dead weights are concentrated upon the diaphragm or flexible member which serves as the intermediate hull.

In a craft such as an outboard, it is also desirable as with the inboard type to mount all dead weights in a resilient fashion so that they will not exhibit concentrated forces upon the hull bottom of the craft. In FIGURES 11 and 12 respectively are shown a resilient mounting for the motor propelling means which is secured to the stern of the craft, and mounting means for the seat which is provided for the occupants of the craft. In FIGURE 11, the outline of the motor is shown in a dotted fashion and designated 121. The engine 121 is secured to the engine mounting by the mounting clamp 122. The engine mount is a rigid member 123 which is joined to the stern of the craft 124 by means of a resilient member 125 which resilient member is in the form of a shock absorber cord. The shock absorber cord 125 is fastened to the engine mount 123 by bolt means 126 and nuts 128. In turn the resilient member 125 is secured to the rigid member 124 by bolt means 127. This shock absorber cord is a resilient structure which exhibits mechanical hysteresis.

In FIGURE 12, substantially the same type of resilient mounting is used, wherein the seat 131 is secured to the sides of the craft by means of resilient mounting structure element 132 which element is in turn secured to the seat 131 as well as the sides 137 of the craft by suitable bolt means 133. The seat 131 is connected to the hinge 134 by member 135 and is also connected to element 132 by bolt 136.

Figure 13:
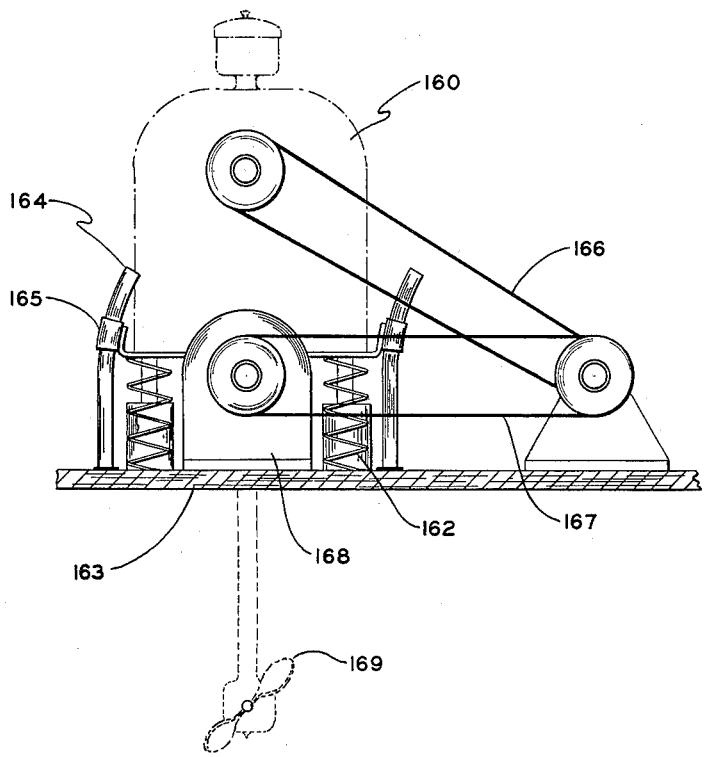

In FIGURE 13 is shown the mounting of the engine particularly for inboard craft. The engine should be mounted so that it can resiliently react to the forces transmitted to it from the flexible bottom and, if necessary oscillate or orbit about a short amplitude and still maintain constant tension on the drive mechanism so as not to affect the propulsion means. Such a construction is set forth in this figure. The motor 160 is supported by members 162 which are in turn resiliently mounted to the bottom of the craft 163. The engine is allowed to move short distances along guide members 164 attached by sleeve members 165. The motor in operation drives belt 166 which in turn is connected to belt 167 which drives gear mechanism 168. The action of mechanism 168 drives propeller 169. Such a construction effects no variation upon the tension of the drive mechanism which in turn propels the craft even though the motor is subjected to forces and resiliently responds. In FIGURE 15 a modified form is shown that employs a rubber pneumatic bag and spring 173 attached to the plane 171 and the hull bottom 172. The plane 171 is hinged at 170 to the fairing 174. FIGURE 16 shows a variation wherein the hinging device 170 is moved aft of the leading edge of the plane 17. FIGURE 17 is another variation in which the shock absorption device 173 has been moved to the leading edge of the plane, where it now operates in expansion, rather than compression, and the hinging mechanism 170 has been located near the trailing edge of the plane.

FIGURES 18 and 18A show side and forward views, respectively, of a warped suppression plane. By designing the forward plane in such a manner, increased lateral stability can be achieved. Another effect of the warped plane design is to produce an essentially flat downwash pattern which contributes to the efficiency of the aft plane. In these figures, the numeral 175 indicates the keel line while numeral 176 indicates the leading edge, also indicated by 178. Numeral 177 indicates the buttock line and numeral 179 indicates the trailing edge. The angle $\theta$ is generally between 5° to about 10° dead rise.

FIGURE 19 illustrates a further plane design variation. By profiling plane 180, increased lift can be achieved. The plane is hinged at 183. Also shown is the fairing 184, hull bottom 182, and shock absorber mechanism 181.

FIGURE 20 graphically illustrates optimum shock absorption characteristics of the shock-absorber that will provide a separation of the dynamic impacts from the static load as well as prevent periodic oscillation from occurring. Upon impact, the plane begins a rapid vertical closure as shown at 185, followed by a decreasing rate of closure as at 186 to the point 187 where the energy of the impact has been totally absorbed. From that point, the plane then rapidly assumes the original position 190, fast acceleration at 188 to decreasing acceleration at 189.

FIGURE 21 shows the results of the proper combination of plane incidence, center-of-gravity location, plane spacing and forward velocity. The wake 192 created by the suppression plane 191 continues to where it begins a rising motion at 193 and finally contacts plane 195 and point 194. The hull bottom is represented at 196. It will be understood that by changing the plane incidence or plane separation for a given speed the upwash at 194 will appear either ahead or aft of plane 195, therefore not contributing to the lift of that plane. In order to assure the maximum contribution of lift at point 194, the upwash should exhibit a relatively smooth transverse section at that point. As shown in FIGURE 22, where 197 indicates the flat wake portion, 199 and 200 show the rising side portions, and 198 indicates the carrier plane. I have discovered that the warped plane, or similar variation thereof, most adequately produces this desirable wake pattern.

FIGURE 23 illustrates actual test results that plot the center-of-gravity location, as expressed in the percentage of gross weight supported by the carrier plane, and the lift/drag coefficient. It is apparent that as this percentage increases beyond 80% and decreases below 60% substantial reduction in efficiency is effected. FIGURE 24 plots the plane incidence and the lift/drag coefficient. It is again apparent that as the incidence drops below 4° or rises above 12° marked decrease in efficiency results.

As many apparently widely different embodiments of my invention may be made without departing from the spirit and scope thereof, it is to be understood that my invention is not limited to the specific embodiments hereof, except as defined in the appended claims.

I claim:

1. A water surface craft comprising two rectangular lifting surfaces fore and aft resiliently secured to a hull bottom at an incidence angle of about 9°, said hull bottom intermediate of said lifting surfaces absent of concentrated dead weights, said lifting surfaces separated by a distance in excess of six feet from the trailing edge of said forward surface to the leading edge of said aft surface, said lifting surfaces resiliently supported at their trailing edge by a dampening support means having mechanical hysteresis, said lifting surfaces fully compressible at a force of from about two to about five times the weight of said craft, said hull bottom closing a hull that has a cross-section of sides, chines and lower bilge lines of said bottom, and having no dead rise from bilge to bilge, non-trips formed by a rise at an acute angle from bilge lines to chines that restrain heeling on turns, a bow section forward of said fore mounted lifting surface comprising an immediate triangular extension of the plane of said fore mounted surface for a distance of at least the length of said fore mounted surface and thereafter defining a keel line and of rapidly increasing dead rise, the bow section forward of said triangular extension being concave and of an arc that directs incident fluids at a downwash angle substantially that of said lifting surfaces, resilient mounting means supported by said sides of said hull disposed between dead weights and the bottom within said hull for elimination of concentrated dead weights against said hull bottom and said fore mounted lifting surface supporting from about 20% to about 40% of the total weight of said craft 2. A water surface craft comprising two rectangular lifting surfaces fore and aft resiliently secured to a hull bottom at a relatively high incidence angle, said hull bottom intermediate of said lifting surface being flexible and absent of concentrated dead weights, said lifting surfaces being widely spaced from each other, said lifting surfaces resiliently supported at their trailing edge by a dampening support means having mechanical hysteresis, said lifting surfaces fully compressible at a force of from about two to about five times the weight of said craft, said hull bottom having no dead rise from bilge to bilge, a bow section forward of said fore mounted lifting surface comprising an immediate triangular extension of the plane of said fore mounted surface for a distance of at least the length of said fore mounted surface and thereafter defining a keel line and of rapidly increasing dead rise, the bow section forward of said triangular extension being concave and of an arc that directs incident fluids at a downwash angle substantially that of said lifting surfaces, resilient mounting means supported by said sides of said hull disposed between dead weights and the bottom within said hull for elimination of concentrated dead weights against said hull bottom and said fore mounted lifting surface supporting from about 20% to about 40% of the total weight of said craft.

3. A water surface craft comprising two rectangular lifting surfaces fore and aft resiliently secured to a hull bottom at an incidence angle between 5° and 12°, said hull bottom intermediate of said lifting surface being flexible, said lifting surfaces separated by a substantial distance from the trailing edge of said forward surface to the leading edge of said aft surface, said lifting surfaces resiliently supported at their trailing edge by a dampening support means having mechanical hysteresis, said lifting surfaces fully compressible at a force of from about two to about five times the weight of said craft, said hull bottom closing a hull that has a cross-section of sides, chines and lower bilge lines of said bottom, and having no dead rise from bilge to bilge, non-trips formed by a rise at an acute angle from bilge lines to chines that restrain heeling on turns, a bow section forward of said fore mounted lifting surface comprising an immediate triangular extension of the plane of said fore mounted surface for a distance of at least the length of said fore mounted surface and thereafter defining a keel line and of rapidly increasing dead rise, the bow section forward of said triangular extension being concave and of an arc that directs incident fluids at a downwash angle substantially that of said lifting surfaces, resilient mounting means supported by said sides of said hull disposed between dead weights and the bottom within said hull for elimination of concentrated dead weights against said hull bottom and said fore mounted lifting surface supporting from about 20% to about 40% of the total weight of said craft.

4. A water surface craft comprising a hull having two lifting planes hingedly secured to the bottom of the hull at fore and aft positions with an incidence angle substantially between 4° and 12°, said planes being separated by a substantial distance between the trailing edge of the fore plane and the leading edge of the aft plane, each of said planes having a movable end resiliently supported on said hull by a shock absorption mechanism whereby said planes may move in response to dynamic impacts during operation of said craft, said planes being fully compressible at a force of from about 2 to about 5 times the weight of the craft, said craft having a weight distribution with said fore plane supporting about 20% to about 40% of the total weight of the craft, said shock absorption mechanism comprising means having an operational characteristic providing an initial rapid rate of collapse of said planes under dynamic impact followed by a slower rate of collapse to the position where the dynamic impact is neutralized by said mechanism and then a rapid rate of expansion from said position followed by a diminishing rate of expansion.

5. The craft of claim 4, the bottom of said hull being substantially flat.

6. The craft of claim 4, said planes being of generally rectangular configuration.

7. The craft of claim 4, said fore plane having a contoured lower surface.

8. The craft of claim 4, said resiliently supported plane end being the trailing end.

9. The craft of claim 4, said distance of plane separation being at least 6 feet, and such that the aft plane receives the upwash from the fore plane at the cruising velocity of said craft.

10. The craft of claim 4, said shock absorption mechanism comprising a pneumatic bag and compression spring.

11. A water surface craft comprising a hull having two lifting planes secured to the bottom of the hull at fore and aft positions with a pre-set incidence angle substantially between 4° and 12°, said planes being separated by a substantial distance between the trailing edge of the fore plane and the leading edge of the aft plane, at least one of said planes being hingedly mounted on the bottom and having a movable end resliently supported on said hull by a shock absorption mechanism whereby said plane may move in response to dynamic impacts during operation of said craft, at least said one plane bing fully compressible at a force of from about 2 to about 5 times the weight of the craft, said craft having a weight distribution with said fore plane supporting about 20% to about 40% of the total weight of the craft, said shock absorption mechanism comprising means having an operational characteristic providing an initial rapid rate of collapse of at least said one plane under dynamic impact followed by a slower rate of collapse to the position where the dynamic impact is neutralized by said mechanism and then a rapid rate of expansion from said position followed by a diminishing rate of expansion.

References Cited in the file of this patent

UNITED STATES PATENTS

| | | |
|---|---|---|
| 538,527 | Lambert | Apr. 30, 1895 |
| 796,846 | Lambert | Aug. 8, 1905 |
| 1,265,035 | Bazaine | May 7, 1918 |
| 1,301,917 | Bolotoff | Apr. 29, 1919 |
| 1,413,383 | Besson | Apr. 18, 1922 |
| 1,631,400 | Collins | June 7, 1927 |
| 1,791,261 | Ballman | Feb. 3, 1931 |
| 1,823,730 | Dornier | Sept. 15, 1931 |
| 1,868,054 | Easthope | July 19, 1932 |
| 2,103,087 | Morris | Dec. 21, 1937 |
| 2,135,394 | Geissen | Nov. 1, 1938 |
| 2,265,206 | Stampfl | Dec. 9, 1941 |
| 2,741,207 | Leone | Apr. 10, 1956 |
| 2,791,980 | Best | May 14, 1957 |

FOREIGN PATENTS

| | | |
|---|---|---|
| 5,003 | Great Britain | of 1913 |
| 471,046 | France | July 1, 1914 |
| 316,391 | Germany | Nov. 26, 1919 |
| 499,803 | France | Nov. 28, 1919 |
| 595,163 | France | July 11, 1925 |
| 249,957 | Italy | Aug. 26, 1926 |
| 308,141 | Great Britain | Mar. 21, 1929 |
| 492,046 | Great Britain | Sept. 14, 1938 |
| 581,736 | Great Britain | Oct. 23, 1946 |
| 451,833 | Italy | Sept. 29, 1949 |
| 1,015,066 | France | June 25, 1952 |